United States Patent
Malaescu et al.

(10) Patent No.: US 10,123,003 B2
(45) Date of Patent: Nov. 6, 2018

(54) METHOD FOR CALIBRATING AN IMAGE CAPTURE DEVICE

(71) Applicant: FotoNation Limited, Galway (IE)

(72) Inventors: Alexandru Malaescu, Bucharest (RO); Florin Nanu, Bucharest (RO); Petronel Bigioi, Galway (IE); Peter Corcoran, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/323,411

(22) PCT Filed: May 28, 2015

(86) PCT No.: PCT/EP2015/061919
§ 371 (c)(1),
(2) Date: Dec. 31, 2016

(87) PCT Pub. No.: WO2016/000874
PCT Pub. Date: Jan. 7, 2016

(65) Prior Publication Data
US 2017/0155896 A1    Jun. 1, 2017

Related U.S. Application Data

(60) Provisional application No. 62/019,704, filed on Jul. 1, 2014, provisional application No. 62/089,381, filed on Dec. 9, 2014.

(51) Int. Cl.
*H04N 17/02* (2006.01)
*H04N 17/00* (2006.01)
(Continued)

(52) U.S. Cl.
CPC .......... *H04N 17/002* (2013.01); *G02B 7/102* (2013.01); *G02B 7/28* (2013.01); *H04N 5/23212* (2013.01)

(58) Field of Classification Search
CPC ... H04N 17/002; H04N 7/102; H04N 5/23212
(Continued)

(56) References Cited

U.S. PATENT DOCUMENTS 4,939,533 A * 7/1990 Okada .................. G02B 7/32
                                                     396/120
8,577,216 B2   11/2013 Li et al.
(Continued)

OTHER PUBLICATIONS

International Search Report and Written Opinion for International Application No. PCT/EP2015/061919 completed Jul. 24, 2015, dated Dec. 2, 2015, 15 pages.
(Continued)

*Primary Examiner* — Michael Lee (57) ABSTRACT

A method for calibrating an image capture device comprises mounting at least one sample device from a batch for movement through a plurality of orientations relative to a horizontal plane. For a given orientation, the sample device is focused at a sequence of positions, each position being at a respective focus distance from the device. A lens actuator setting is recorded for the sample device at each position. This is repeated at a plurality of distinct orientations of the sample device. Respective relationships are determined between lens actuator settings at any given position for distinct orientations from the plurality of distinct orientations and actuator settings at a selected orientation of the plurality of distinct orientations. Lens actuator settings for the image capture device to be calibrated are recorded at least at two points of interest (POI), each a specified focus distance from the device with the image capture device positioned at the selected orientation. The image capture device is calibrated for the plurality of distinct orientations based on the determined relationships and the recorded lens actuator settings.

17 Claims, 8 Drawing Sheets

(51) Int. Cl.
*G02B 7/28* (2006.01)
*H04N 5/232* (2006.01)
*G02B 7/10* (2006.01)

(58) Field of Classification Search
USPC .......................................................... 348/188
See application file for complete search history.

(56) References Cited

U.S. PATENT DOCUMENTS

| | | | |
|---|---|---|---|
| 8,908,083 B2 | 12/2014 | Brunner et al. | |
| 8,941,192 B2 | 1/2015 | Calvet et al. | |
| 9,160,920 B2 * | 10/2015 | Getman | H04N 5/23212 |
| 9,167,143 B2 | 10/2015 | Ollila et al. | |
| 9,258,473 B2 | 2/2016 | Azuma | |
| 9,313,390 B2 | 4/2016 | Velarde et al. | |
| 2009/0273681 A1 * | 11/2009 | Border | H04N 5/23212 |
| | | | 348/189 |
| 2012/0050543 A1 * | 3/2012 | Colla | H04N 17/002 |
| | | | 348/187 |
| 2012/0169885 A1 * | 7/2012 | Wang | G03B 43/00 |
| | | | 348/180 |

OTHER PUBLICATIONS

Korean Patent Office, Office Action dated Aug. 20, 2018 in Korea Application No. 10-2017-7002750, "A Method for Calibrating an Image Capture Device" with English translation of Office Action Summary, 6 pages.

* cited by examiner

| V[-90] | V[-30] | V[0] | V[+30] | V[+90] | Cap | Focus Step |
|---|---|---|---|---|---|---|
| 64 | 83 | 98 | 111 | 119 | 189 | |
| 74 | 99 | 119 | 135 | 149 | 192 | |
| 92 | 113 | 130 | 145 | 158 | 195 | |
| 104 | 123 | 138 | 152 | 164 | 198 | |
| 113 | 130 | 144 | 157 | 169 | 200 | |
| 119 | 135 | 148 | 161 | 173 | 202 | Step 1 (infinity) |
| 136 | 150 | 162 | 173 | 184 | 208 | Step 2 |
| 150 | 162 | 173 | 184 | 194 | 214 | Step 3 |
| 159 | 171 | 181 | 191 | 200 | 220 | Step 4 |
| 168 | 178 | 188 | 197 | 206 | 226 | Step 5 |
| 174 | 184 | 193 | 202 | 210 | 231 | Step 6 |
| 180 | 189 | 198 | 206 | 215 | 236 | Step 7 |
| 185 | 194 | 202 | 210 | 218 | 241 | Step 8 |
| 189 | 198 | 206 | 214 | 221 | 246 | Step 9 |
| 193 | 201 | 209 | 216 | 224 | 251 | Step 10 |
| 196 | 204 | 212 | 219 | 227 | 256 | Step 11 |
| 199 | 206 | 214 | 221 | 228 | 261 | Step 12 (macro) |
| 200 | 208 | 215 | 222 | 229 | 264 | |
| 203 | 210 | 217 | 224 | 230 | 267 | |
| 206 | 213 | 220 | 227 | 233 | 270 | |
| 212 | 219 | 226 | 233 | 239 | 273 | |
| 238 | 245 | 251 | 255 | 255 | 276 | |

Figure 5

| V[-90] | V[-30] | V[0] | V[+30] | V[+90] | Cap | Focus Step |
|---|---|---|---|---|---|---|
| 115 | 132 | 146 | 160 | 173 | 174 | Step 1 (infinity) |
| 131 | 146 | 159 | 171 | 183 | 180 | Step 2 |
| 144 | 157 | 169 | 181 | 191 | 186 | Step 3 |
| 155 | 167 | 178 | 189 | 199 | 192 | Step 4 |
| 164 | 175 | 185 | 195 | 204 | 197 | Step 5 |
| 171 | 181 | 191 | 201 | 209 | 202 | Step 6 |
| 176 | 186 | 196 | 205 | 213 | 207 | Step 7 |
| 182 | 192 | 201 | 210 | 218 | 212 | Step 8 |
| 187 | 196 | 205 | 213 | 221 | 217 | Step 9 |
| 191 | 200 | 208 | 216 | 224 | 222 | Step 10 |
| 194 | 203 | 212 | 219 | 226 | 228 | Step 11 |
| 197 | 206 | 215 | 222 | 228 | 233 | Step 12 (macro) |

METHOD FOR CALIBRATING AN IMAGE CAPTURE DEVICE

FIELD OF THE INVENTION

The present invention relates generally to the field of digital image capture devices. More particularly, the invention relates to a method for improving autofocus operations in a digital image capture device where the device and thus the device camera module will be used in a number of different orientations.

More specifically this invention relates to calibrating auto-focus systems for digital camera modules, in particular miniaturized focus systems such as voice-coil and MEMS focus systems.

BACKGROUND

A camera's autofocus (AF) system automatically adjusts the camera lens to obtain focus on a subject. In general, AF systems use contrast sensors within the camera (passive AF) or by emitting a signal to illuminate or estimate the distance to a subject (active AF). Passive AF may employ either contrast detection or phase detection methods, but both rely on contrast for achieving autofocus.

Some digital cameras utilize autofocus sensors that are different from the camera's image sensor. This may, for example, occur in single-function digital cameras. In small multifunction devices such as mobile phones, tablet computers, personal digital assistants and portable music/video players, however, separate image and autofocus sensors are often not used. In devices such as these, autofocus operations can involve adjusting the position of the camera lens (or lens assembly) at a specified number of locations; and evaluating the focus (e.g., contrast) between corresponding points in successive images (maximum contrast is assumed to correspond to maximum sharpness or "best" focus).

Multifunction devices typically evaluate contrast/focus at a fixed number of points in an image and, when the lens is moved to obtain successive images, a fixed number of lens positions or points of interest (POI). As such, these devices can provide autofocus operations at a fixed rate and with a fixed resolution.

US 2013/0076967 describes an autofocus operation for a digital image capture device, using knowledge of the device's orientation. The method includes determining the orientation of the device from an orientation sensor where one illustrative orientation sensor is an accelerometer. Based at least in part on the device's orientation, a range of motion may be determined for the autofocus operation. This range of motion refers to the distance through which a lens, or lens assembly, is moved during the autofocus operation.

However US 2013/0076967 assumes that the effects of device orientation are linear in nature and further assumes that the actuator characteristics of individual devices are consistent at different orientations. In fact this is not the case and actuator characteristics vary significantly between orientations and, in turn, pre-defined POIs are not sufficiently accurate to enable auto-focus algorithms to work correctly at non-horizontal orientations.

U.S. Pat. No. 8,577,216 discloses calibrating a lens actuator used to move a lens within a search range during an auto-focus process in an image capture device. The image capture device adjusts reference positions for the search range based on lens positions selected for different focus conditions, the different focus conditions including a far focus condition and a near focus condition. The focus conditions are determined based on a detected environment in which the device is used. Detection of an indoor environment may indicate a likelihood of near object focus, while detection of an outdoor environment may indicate a likelihood of far object focus.

SUMMARY

According to a first aspect of the present invention there is provided a method according to claim 1.

The invention provides for the accurate calibration of focusing steps in digital camera modules, while avoiding a need to precisely calibrate each individual module for different angular orientations.

According to a second aspect, there is provided a device according to claim 27.

Embodiments of the invention are particularly applicable to the mass production of miniaturized consumer cameras with focus actuators based on voice-coil module (VCM) or micro-electromechanical systems (MEMS).

BRIEF DESCRIPTION OF THE DRAWINGS

Embodiments of the invention will now be described, by way of example, with reference to the accompany drawings, in which.

DETAILED DESCRIPTION OF THE INVENTION

This disclosure pertains to systems, methods, and computer readable media for dynamically adjusting an image capture device's autofocus (AF) operation based, at least in part, on the device's orientation. More specifically this invention relates to the provision of an improved calibration of auto-focus systems for digital camera modules, in particular miniaturized focus systems such as VCM and MEMS focus systems to overcome the inherent non-linearities of such systems. In particular the invention is applicable to mass production of camera modules where full closed loop control of the displacement of the focus actuator may not be feasible or not practical due to cost restrictions.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In this context, it should be understood that references to numbered drawing elements without associated identifiers (e.g., 100) refer to all instances of the drawing element with identifiers (e.g., 100 *a* and 100 *b*). Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of image capture devices having the benefit of this disclosure.

Autofocus Systems

For a better understanding of the invention it is helpful to understand the operation of autofocus (AF) systems in a modern handheld imaging device. From a top-level perspective the autofocus system can be separated into two principle components—a camera module that can adjust its focus and acquire images and an autofocus algorithm, typically implemented in an image signal processor (ISP) which is a dedicated camera pre-processor for the main device including the camera module. This main device can be any of a dedicated digital stills or video camera, a camera phone, smart phone, tablet computer or any such device.

Autofocus algorithms are well known and there is substantial literature on various approaches and refinements, but practically all AF algorithms operate a technique known as contrast-based autofocus (CB-AF). In simple terms this involves analyzing regions of the imaged scene to determine local contrast, then the focus is moved to a next position where contrast is again determined and based on the change in contrast, a further adjustment is determined. Such algorithms rely on accurate positioning of the optical system for each focus step or point of interest (POI).

In a typical optical system there will a limited number of POIs because the optical differences between two POIs must be sufficiently distinct to provide a discernable difference in relative contrast. In a state-of-art handheld imaging device there are typically 8-12 POIs and beyond a distance of 2 m-5 m, depending on the optical design, the lens is considered to be in the infinity position. Nonetheless, it will be appreciated that the present invention is equally applicable to more granular focus and an increased numbers of autofocus POIs.

If POI accuracy is poor, i.e. if there is a discrepancy between the actual lens focus distance and the nominal focus distance for the POI, then the performance of the autofocus will also be poor, resulting in longer focus times and focus hunting—where the camera continually switches between two focus positions without locking onto a preferred (and correct) focus setting.

Turning now to the camera module actuator technologies employed in today's handheld digital imaging devices. Two particular technologies are leading in the market, voice coil motor (VCM) and micro-electromechanical system (MEMS).

Voice Coil Motor Systems

VCM systems employ an inductive coil driven by a constant current source. In theory, the actuator displacement is linear with inductance and proportional to the driving current. In a VCM the optical component is normally the main lens barrel which may include multiple composite lenses and is a relatively heavy mass. Movements using VCMs are repeatable and gearless, with lens position fixed by balancing motor and spring forces. The spring returns the lens to the infinite-focus position, and no power is dissipated unless focusing is required. It is mechanically robust, shock-resistant, and has low-cost mechanics. These motors typically have minimal hysteresis and therefore have a direct current-vs-position relationship, so that lens-position feedback is not normally required.

Typical full stroke displacement for a VCM ranges from 0.25 mm up to several millimeters.

MEMS Systems

An example of a MEMS actuator device adapted to effect movement of an optical element, such as a lens, lens group or an imaging sensor, in a focal plane, i.e., an X-Y plane orthogonal to an optical or Z axis, of a camera is described in detail in US patent application US2012/0081598, incorporated herein by reference. MEMS actuators differ from VCM is that the electrical control is provided as a voltage and the inherent mechanisms of the actuator are capacitive in nature. Nevertheless the MEMS is driven by an electrical control signal and the actuator displacement is related linearly to its impedance (capacitance).

In contrast to VCM, full stroke for MEMS is typically less than 0.2 mm as only a single lens or optical element is moved.

In summary we can say that VCM is an inductive electrical system driven by a constant current signal, whereas MEMS is a capacitive electrical system driven by a constant voltage signal. The calibration methods provided in this disclosure can be advantageously adapted to both types of focus actuator to provide more reliable and accurate determination of focus POIs without a need for sensing of the actuator position or the implementation of a closed loop control system.

Gravity Force Due to Non-Horizontal Orientation

Figure 1:
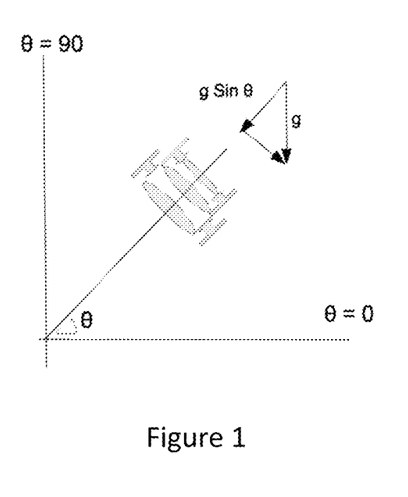
FIG. 1 shows schematically a lens component of a camera module oriented at an angle $\theta$ to the horizontal and indicating its effect on gravitational force on the lens component.

This effect of gravity on actuator displacement of a lens system is noted in US 2013/0076967, which describes a method to perform an autofocus operation for a digital image capture device, using knowledge of the device's orientation. By orientation, we mean relative rotation of a camera about a horizontal axis running parallel to the plane of the device image sensor—tilting the camera up or down—as shown in FIG. 1.

As previously mentioned, today's state-of-art focus actuators accommodate in the range of 8-12 distinct POIs. Typically an electrical control signal (ECS) for the actuator is driven by a digital to analog convertor (DAC) with a greater resolution—often an 8-bit DAC code with 255 distinct voltage output levels, or a 10-bit DAC code with 1024 voltage levels—than the number of POIs required. Thus an auto-focus algorithm specifies a POI, the POI is converted into a required DAC code and a DAC converts the DAC code into an equivalent analog actuator voltage or current value depending on the actuator output circuitry.

The full range of ECS is not generally employed, as the optical component (lens or lens barrel) requires an initial startup voltage or current before it begins to move. Also, to prevent the actuator attempting to move beyond its end position, the ECS will typically be limited to some maximum value. Thus, typically a limited subset of the full range of DAC codes and ECS range is used to drive the actuator.

Figure 2:
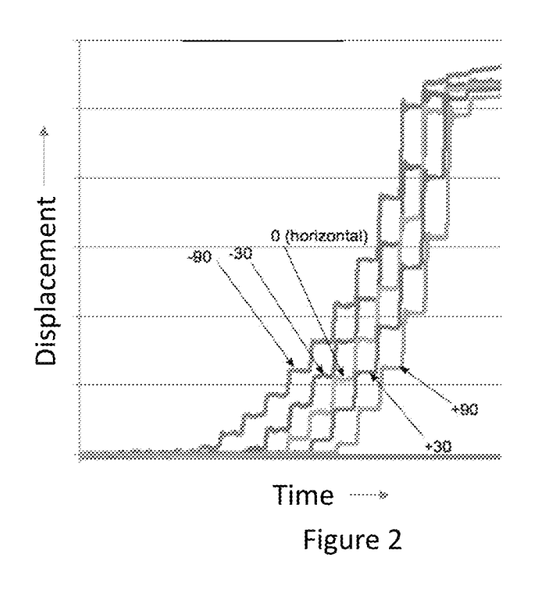
FIG. 2 shows an exemplary actuator displacement characteristic for a MEMS camera module at multiple orientations.
Figure 3:
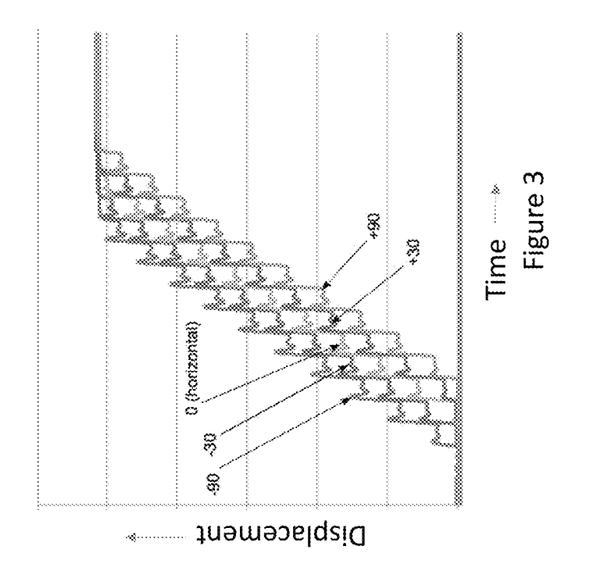
FIG. 3 shows an exemplary actuator displacement characteristic for a VCM camera module at multiple orientations.

Examples of a practical device characteristic for a MEMS sensor is provided in FIG. 2 and for a VCM module in FIG. 3. Note the ringing at each step for the VCM actuator in FIG. 3 is larger than for the MEMS actuator in FIG. 2. This is because in VCMs, the entire lens barrel is normally moved and this large mass continues to oscillate for 10 s of milliseconds after each step movement.

One point to note from FIGS. 2 and 3 is that the individual steps of these operational characteristics do not provide the same displacement range at different angles of orientation. For example, FIG. 2 shows the effects of different angular orientations on a MEMs actuator characteristic, in particular voltage range for driving the actuator when at −90 degree orientation determined is somewhat wider than that at +90 degree orientation. Thus, in addition to the extra (or reduced) 'starting-force' that the actuator must overcome, it is clear that the calibration of the individual focus POIs should be modified. Due to the non-linearities of these characteristics, this cannot be achieved by any simple modifying of the ECS—e.g. by increasing the ECS by a fixed amount of current or voltage. This may correct the starting point of the actuator characteristic, but the individual steps that follow will be at incorrect displacements for the relevant POIs. In turn this will adversely affect the main auto-focus algorithm(s) implemented on a device that incorporates the camera module.

Practical Calibration of Modules

Full calibration of a camera module would typically involve using the device DAC to generate a sequence of step functions and stopping at each POI, pausing after each, typically for 30 ms [the time for image frame acquisition at 30 frames per second (fps)] or at 60 ms if the actuator requires additional settling time, as can be the case with a VCM actuator. To take into account different camera orientations, the actuator step characteristics could be measured with a camera orientation at each of −90, −30, 0, +30 and +90 degree angles to the horizontal plane. This would be generally sufficient to achieve required levels of accuracy, but additional intermediate angular measurements might be required or employed to improve accuracy and reliability.

In order to fully calibrate a camera across a number of orientations for a number of different points of interest, the camera would typically need to be fitted to a robotic arm, for example of the type available from ABB, to which a displacement system, for example, a Keyence laser displacement system, is fixed and which is capable of moving a target between a range of positions relative to the camera. Each of the arm, displacement system and the camera would need to be connected to an acquisition system capable of controlling the camera module, displacement system and the arm and automatically running a sequence of calibration tests. Typically, the acquisition system would connect to the camera via a USB or similar serial connection and use dedicated codes to run a calibration routine which moved the camera through each of the required orientations and each POI at each orientation.

It will be appreciated that especially for mass market lens systems for devices such as smart phones, characterizing every device for every POI at a variety of camera orientations would not only be time consuming, but also would require complicated test equipment for moving the camera through its various orientations and at each orientation moving a test card through the various POIs. This would clearly be uneconomic.

On the other hand, it is appreciated that there can be some degree of variability of devices within a batch and so some level of device specific calibration needs to be performed.

Embodiments of the present invention are based on generically characterizing a particular actuator design; and based on this characterization, deriving and performing testing on one or more samples from a batch to determine a statistical characterization of a particular batch across all orientations. A single orientation measurement characteristic is then determined for each module actuator of a batch and this data is stored with the module.

Then, in the handheld device that incorporates the individual camera module, an appropriate DAC setting for a next focus POI for an auto-focus can be determined from the device-specific single-orientation characteristic, the statistical multi-orientation batch characteristic and the current orientation.

Alternatively, within the device, a one-time programmable memory can include a set of device specific multi-orientation characteristics programmed at calibration to directly return a required DAC code for any required POI at any given orientation.

Generic Actuator Characterization

The specific example give below relates to calibrating a MEMS actuator.

A similar analysis on VCM would focus correspondingly on the impedance (inductance) of the voice-coil and its linearity w.r.t. displacement. Similarly the ECS would be current signal, rather than a voltage one.

Figure 4:
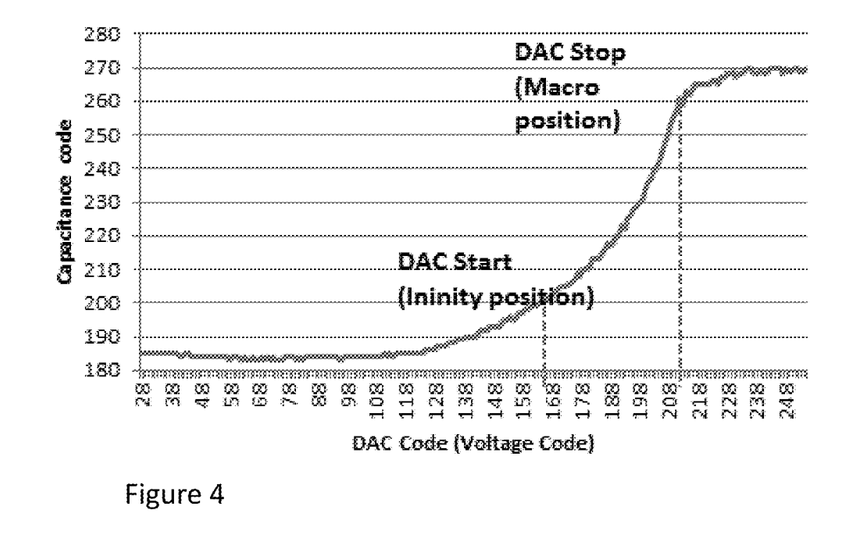
FIG. 4 shows the relationship between MEMS camera module capacitance and digital-to-analog convertor (DAC) control codes.

As will be noted from FIG. 4, one complication with a MEMS actuator, unlike a VCM actuator, is that the relationship between actuator displacement and ECS (or DAC code) is not linear. Neither is the relationship between actuator capacitance and DAC voltage linear. However, it is straightforward to accurately measure capacitance and there is a highly linear correlation between actuator displacement and MEMS capacitance. Thus, actuator performance may be characterized by measuring capacitance, which is simpler and provides the same accuracy as a direct measurement of actuator motion and final displacement. (The conversion factor from motion to capacitance is nominally 0.68 pF/um for the MEMS module presented in the example provided herein.)

FIG. 4 also shows that the infinity position, (and lower desired threshold) of the actuator (and lens) displacement for a lens actuator is typically slightly above the natural rest position of the actuator. When the actuator is first powered up, it is initialized to this infinity position.

Also, the macro (close focus) displacement position is typically slightly below the saturation position, to avoid mechanical and electrical stress on the actuator. Thus, it is desirable that DAC output is limited to the DAC Stop, or macro value.

As will be seen from FIG. 2 in particular for both infinity and macro, and for FIG. 3 in relation to infinity, each different orientation of the device will have a different DAC macro stop setting and a different DAC infinity setting; whereas their capacitance at these settings will be generally constant across all device orientations.

The respective capacitances at infinity and macro POIs are determined by optical calibration. This process involves using an optical chart that is placed at a distance of, typically, 2.4 m to determine the infinity capacitance setting. The actuator operates the lens through the full focus range to determine the infinity focus peak which is determined by measuring the sharpest image of the optical chart. This process is repeated for the macro position, but the optical chart is moved to a 10 cm distance from the lens. The module is in the horizontal (0 degree) orientation for these tests and the macro and infinity positions are adopted across all orientations.

Once the capacitance for actuator infinity and macro positions are determined, the actuator displacement range (ADR) is defined.

It should be noted that the capacitance characteristics are static, rather than dynamic, timed measurements i.e. the actuator should be allowed to settle following a step-function input as seen from FIGS. 2 and 3.

Thus for each voltage setting of the DAC the actuator (and thus its capacitance) is allowed to settle to its final value before the DAC code (ECS voltage) is changed to advance the camera module to its next position.

The measurements for each orientation −90, −30, 0, 30 and 90 degrees generate a respective set of DAC voltage codes corresponding to a common set of capacitances. An example of DAC voltage codes vs capacitance relationship across all of the 5 orientations is shown in FIG. 5.

Figure 5:
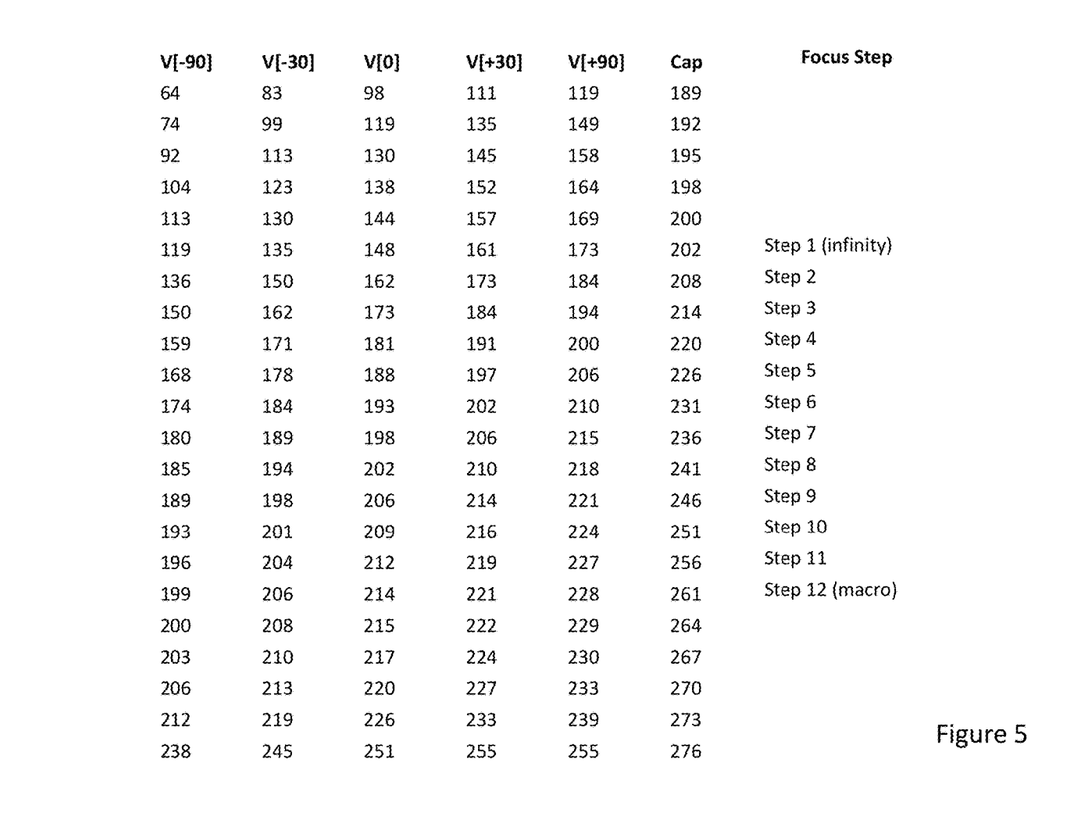
FIG. 5 shows batch characterization DAC code values for a MEMS camera module obtained for multiple orientations at a range of POI.

In FIG. 5, for simplicity, the actuator displacement range is divided into a number of equal displacements associated with a focus POI. In this example we assume 10 additional POI between the infinity and macro positions and this leads to a total number of 12 POIs. The actuator displacement range (ADR) is thus divided into 11 equal steps.

Such a table would provide a particular camera with all of the DAC code calibration information it required to implement an auto-focus algorithm, however, it will be appreciated from the discussion above that the calibration steps required to produce this information for every camera module would be uneconomic.

Statistical Batch Characterization

As explained, ideally it would be desirable to individually characterize each module, but in a large scale production environment, this is simply not practical. However it is possible to perform a full characterization on a limited random sample of devices from a batch and determine statistical batch data i.e. to provide tabular data such as shown in FIG. 5 averaged from data extracted from a sample set of devices. This can in turn be used to characterize the remaining modules from a single set of measurements.

In one implementation, this batch characterization is performed on each production batch to take account of the many variations that are possible in terms of production environment, including input components & materials, operational procedures, machine settings and differences between individual production lines.

A random sample of devices is selected from a production batch. A typical sampling rate is 1 from 1,000 devices for initial testing. Thus from a batch of 50,000 a sample of 50 devices is selected. Individual modules are connected electrically to a test rig mounted in a robotic arm that can move the module to different orientations as outlined above. Each device is then run through a sequence of sweeps of the full range of focus running from infinity position to macro and typically using 32 (one in every 8), or 64 (one in every 4) DAC codes. Device capacitance is measured at each focus setting.

Dependent on the properties and characterization of the module, more granular DAC codes may be used in certain regions. In the case of this example MEMS module it would be desirable to have additional resolution towards the macro POI and thus a resolution at the level of individual DAC codes may be used for this portion of the characteristic.

Multiple sweeps, typically 3, of the focus range from infinity to macro and back to infinity are performed to determine device hysteresis and repeatability. This process is repeated at each of the major orientations—in our exemplary embodiment +90, +30, 0, −30 and −90 degrees. If the resulting dataset, appears beyond normal tolerances for any of the principle orientations, or if hysteresis or repeatability are beyond predetermined variations, then a higher level of sampling from this batch may be indicated. Ideally, however, the data, and its repeatability and hysteresis for individual modules and the overall batch sample will lie within predetermined tolerances.

Additional batch characterization may include repeating these measurements across a set of expected operating temperatures, humidity conditions, particulate concentrations and other environmental factors. Note that, as these modules are sealed, only temperature is normally given consideration but in certain embodiments additional environmental factors may be important.

After a batch has passed primary testing, a large amount of batch characterization data is available and is processed statistically. This provides a set of batch-specific characteristics. Each batch data will vary in average from a reference dataset and also in variance. The objective is to (i) ensure that these variations are not beyond acceptable thresholds, and (ii) to provide a means to characterize the remaining modules in a batch without a need to repeat the entire set of detailed characterizations as described above.

At this point a generic device characterization has been presented and a means to determine equivalent characteristics of a random batch sample. Thus a set of mean batch characteristics such as shown in FIG. 5 are available based on a sample of, say, 50 units from a batch of 50,000. (Note that FIG. 5 is divided into POI intervals for illustrative purposes only. During batch characterization, when sample devices are being fully calibrated, it is not necessary to choose calibration points at the same POI as will ultimately be required by a device AF algorithm—rather it is important to be able to relate the actuator setting of the device at a given focus distance (for a MEMS device capacitance) across a number of orientations.) In addition to the averaged characteristic, data is also available on the variance of the characteristic for each angular orientation. Assuming that no abnormal results have presented both averaged characteristic and the associated variance should be within certain predetermined limits and it is next required to apply this batch characteristic to the remaining modules in the production batch.

Figures 6, 7:
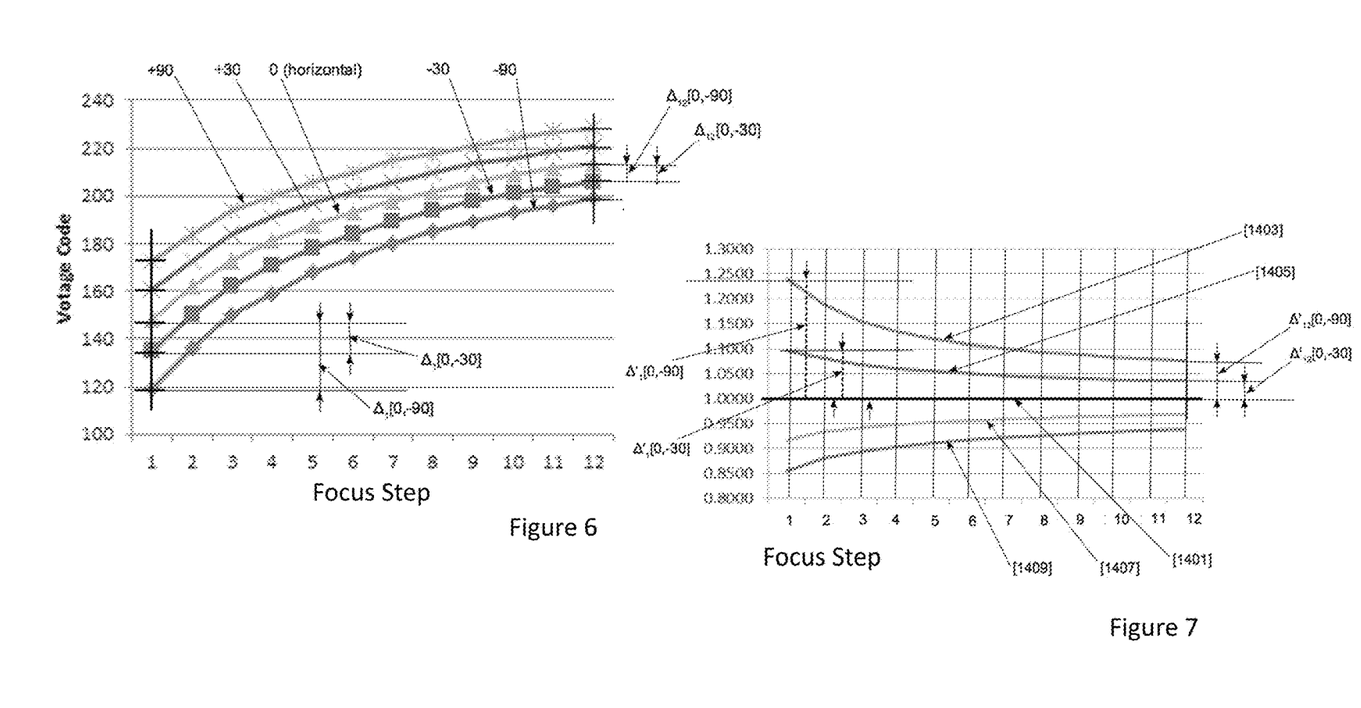
FIG. 6 shows the data of FIG. 5 graphically illustrating the relative relationships between calibration measurements.
FIG. 7 shows a conversion matrix derived from the data of FIG. 6.

The data from FIG. 5 can be represented graphically as shown in FIG. 6. It can be seen that at any focus distance, which for MEMS is synonymous with capacitance, the DAC codes at each orientation +90, +30, −30 and −90 degrees can be related to the DAC code at a common orientation—in this case 0 degrees (horizontal).

FIG. 7 shows the data from FIG. 6 with the data for the +90, +30, −30 and −90 orientations normalized vis-à-vis the horizontal orientation. This normalized data is referred to as a conversion matrix and it is this data which characterizes any given batch.

Individual Device Characterization

In order to characterize an individual camera module, the camera can be connected to a controller fitted to a rig similar to that used to full device calibration, except that the robotic arm required to move the device through different orientations is not required.

Instead, a test pattern is moved to the infinity position and device capacitance at that position is determined. In the table shown in FIG. 8, the capacitance is measured as 174. The DAC code at this position is also recorded, in this case, it is 146—note the difference in these figures from the batch average in FIG. 5.

The test pattern is then moved to the macro position and again the capacitance (233) and DAC code (215) at this position are recorded.

For simplicity in the following discussion, the capacitance range between the infinity position and macro position is divided into linear POI intervals. However, as will be appreciated, this division can be non-linear. The required displacements are dependent on the optical design of the lens elements and the requirements of the auto-focus algorithm to be used in the camera device. In one embodiment, the camera is now stepped to each POI, allowed to settle at the required capacitance and the DAC code measured at that capacitance and recorded. This provides the DAC codes in FIG. 8 in column V[0] between values 146 and 215.

In another embodiment, the relationship between DAC code and capacitance, as illustrated in FIG. 4 is modelled according to the relationship: Capacitance=A*exp (B*DAC+C). The exponential B can be determined at batch calibration time using the full set of data such as shown in FIG. 5. The A and C values can then be fitted to the voltage, capacitance pairs for the infinity and macro settings obtained for a specific device, so enabling the DAC codes intermediate macro and infinity at horizontal to be interpolated according to the capacitance values intermediate infinity and macro.

Figure 8:
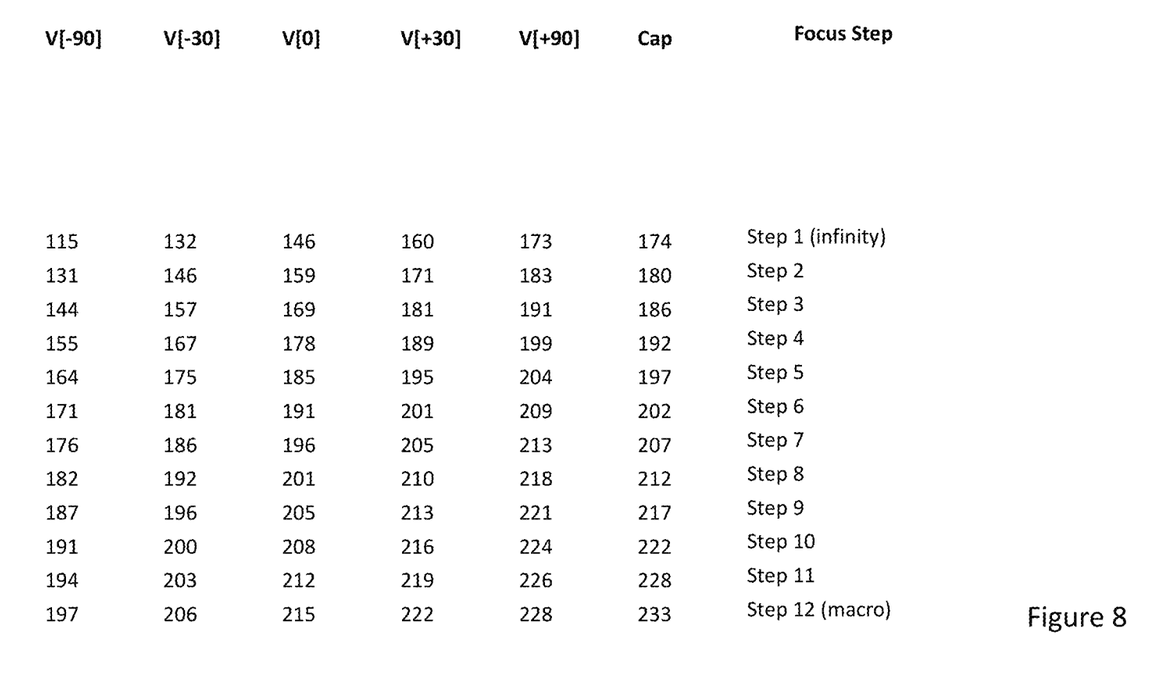
FIG. 8 shows the data calculated for a specific camera lens module based on the conversion matrix of FIG. 7 and single orientation measurements for the module.

Now with the DAC codes at horizontal for each POI between infinity and macro settings and the conversion matrix of FIG. 7 for the batch, the remainder of the table shown in FIG. 8, i.e. columns V[−90], V[−30], V[30] and V[90] can be determined. It should be appreciated that where the conversion matrix includes data points which do not correspond with the POI interval capacitances for the device being calibrated, some interpolation will be required.

The above embodiment has been described for a MEMs actuator where the relationship between DAC code (ECS voltage) and displacement is non-linear.

However, for a VCM camera module, the relationship between DAC code (ECS current) and displacement is linear and for that embodiment, characterization can be based on using DAC codes only for each POI to build a conversion matrix as shown in FIG. 7 and then for each camera module, to obtain DAC codes for horizontal orientation at either at infinity and macro and interpolating between them; or for each POI between macro and infinity analogous to the approach described for a MEMS actuator.

In any case, it will be seen that the above embodiments enable device specific calibration to be performed at one orientation one, and for as few as two measurements at that orientation, so providing the benefits of full calibration but on a much rationalized basis.

Alternative Embodiments

The principle embodiment is described above and involves individual devices being calibrated for multiple orientations at production by embedding a set of detailed LUTs in a device one-time programmable (OTP) memory. However if multiple environmental factors and multiple angular orientations are provided and the number of focus POIs increases then the demands on OTP memory may require a more limited calibration be provided for the actuator.

Note that in certain devices, in particular MEMS based focus actuators, it is possible to determine orientation from the actuator itself. This is described in US2014/0028887, incorporated herein by reference. In such embodiments the main device AF algorithm is not required to obtain orientation information from the main device as this can be determined from the actuator characteristics themselves.

In one alternative embodiment the actuator is not programmed with POI settings for all orientations by applying the conversion matrix to the horizontal orientation DAC codes. Instead the device is only programmed with the horizontal orientation DAC codes and the conversion matrix is provided instead as a driver for a handheld imaging device in which the module is embedded. In this embodiment the camera module driver software will determine the horizontal orientation DAC codes of the actuator during device operation and will dynamically generate the POI data based on the orientation of the device and the conversion matrix provided in the driver. This approach has disadvantages in that modules are tied to the driver code that incorporates the conversion matrix from a production batch, but it provides advantages of greater software flexibility and may be advantageous where the stability between production batches is determined to be relatively uniform.

In another embodiment an option may be provided to adjust the macro and/or infinity positions up/down by a number of DAC codes. The user could use an optical calibration chart positioned at the macro/infinity positions. In accordance with such an embodiment the pre-set POI values in the OTP may be similarly adjusted to keep the relative positions of the POI based on the new macro/infinity setting(s). This would generate an adjusted horizontal orientation DAC code set that would, in turn require adjustments to the DAC codes for other orientations. Such user adjustments may require a software application that can analyze the stored OTP profile, generate new multi-orientation DAC codes based on stored profile and reprogram the OTP memory.

As flagged above, it is appreciated that camera module performance can drift over time, for example, due to operating temperature variation, device aging or even device on-time.

Figure 9:
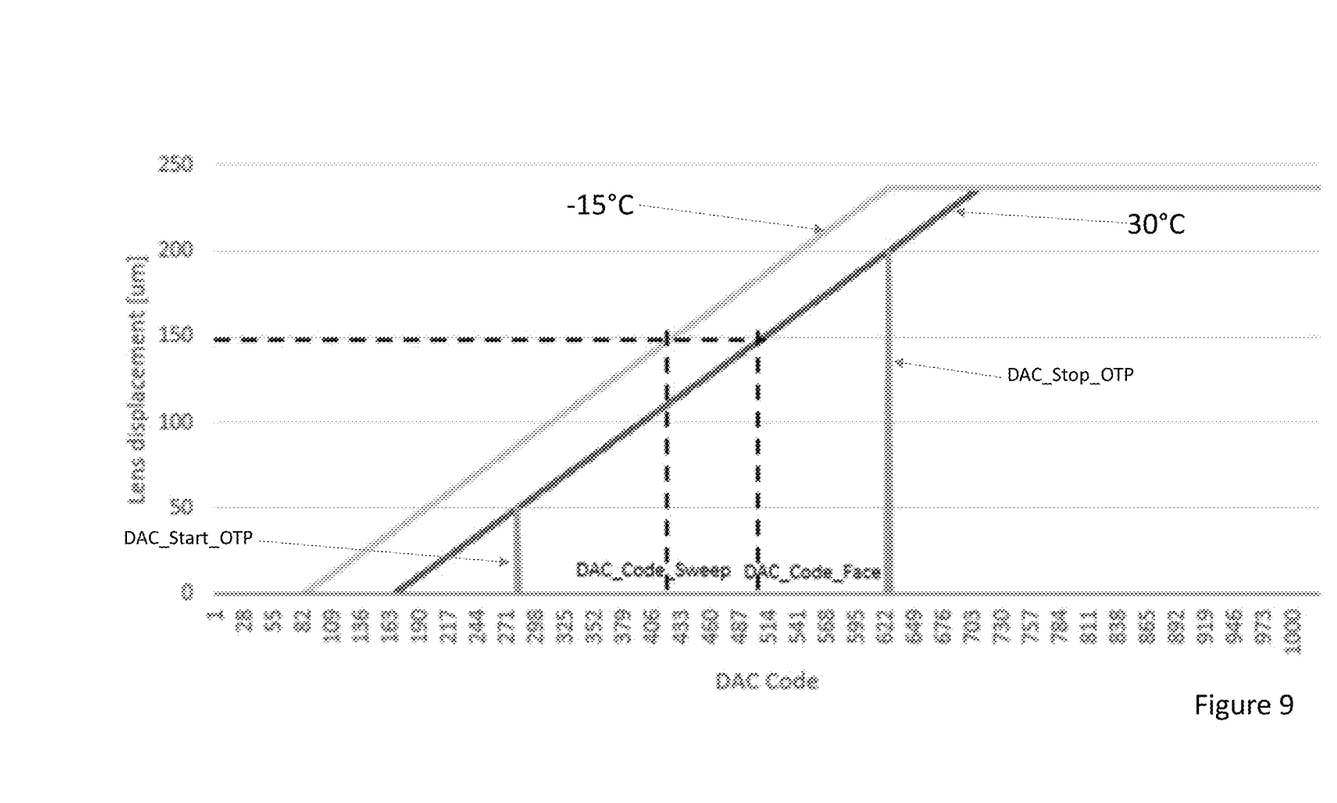
FIG. 9 illustrates the effect of operating temperature variation on VCM lens displacement.

Referring now to FIG. 9, a VCM camera module has DAC_Start_OTP and DAC_Stop_OTP, computed at a room temperature of +30° C. and stored in OTP memory. Starting from these values, the camera module can be calibrated for all intermediate positions and orientations as described above. If, however, the operating temperature were to change to say −15° C., the displacement curve relating lens displacement to DAC code would shift left. In this case, DAC_Start_OTP corresponds to 50 um lens displacement for the 30° C. ambient temperature, and 85 um at −15° C. It means that with the calibrated DAC_Start_OTP, the camera module could not reach the infinity position.

As indicated above, batch characterization may include providing discrete sets of calibration data for respective operating temperatures across a range of operating temperatures; with a camera module using the stored DAC codes calibrated for the closest calibrated temperature(s) to a measured (lens) operating temperature. (The module could either pick the closest set or interpolate between the data for adjacent sets.)

As a further alternative, the variation between discrete sets of calibration data for respective operating temperatures could be modelled so that only one (or at least fewer) sets of calibration data would be stored within a device along with modelled parameters mapping that data to the operating temperature of the device.

However, swapping between or using stored DAC codes according to a measured operating temperature may not fully compensate for all operating variations. (Also, it may not be possible to obtain an accurate measurement of lens temperature.)

As an alternative to using an optical calibration chart to compensate for camera module drift, it is also possible to use other known or fixed references to automatically adjust the DAC codes, even on-the-fly, to compensate for camera module operating variations. One such fixed reference is the typical adult human face where, in particular, the distance between the eyes is known to be between 6.5 and 7 cm. Using such a fixed reference enables the DAC_Start and DAC_Stop to be re-calibrated to compensate for various operating conditions as described below:

This compensation can be performed from time to time when a normal face is detected i.e. a face where the distance between the eyes is indeed between 6.5 and 7 cm rather than a printed face or a babies face or a side facing face. The face also needs to be at a distance where the camera optics enable the face to be brought into focus.

The compensation operates as follows:
- a real (front facing) face is detected within an acquired image—this can be a face detected and tracked over a period of time preceding calibration compensation image acquisition;
- the distance between eyes (ed) is assumed to be between 6.5-7 cm;
- the camera module focal length (f) is known;
- the camera module pixel size (ps) is known;
- the eye distance (edp) in pixels is measured;
- the distance to the subject (ds) is calculated as follows:

$$ds = f*(ed/(edp*ps));$$

- the lens displacement (ld) for this distance (ds) can be calculated using the following relation:

$$1/(ld+f) = 1/f - 1/ds;$$

- the corresponding DAC_Code_Face for this lens displacement (ld) can be calculated based on the calibrated data as shown in FIG. 9, in the example, a lens displacement of 150 um nominally provides a DAC Code of close to 514—but as can be seen, this drifts (leftwards) with temperature.

The camera module then runs a sweep across a range of lens displacements to obtain DAC_Code_Sweep—the lens displacement providing the maximum sharpness for the face region.

If the difference between DAC_Code_Face and DAC_Code_Sweep is smaller than a threshold, the calibrated OTP data is regarded as still valid and no compensation is performed.

If the difference between the two DAC Codes is larger than a threshold, this signals that something changed in the camera module (temperature shift, aging, etc.) and a correction is required to DAC_Start_OTP and DAC_Stop_OTP.

Where the displacement curve is linear this correction can be performed as follows:
DAC_Start_New=DAC_Start_OTP−(DAC_Code_Face−DAC_Code_Sweep)
DAC_Stop_New=DAC_Stop_OTP−(DAC_Code_Face−DAC_Code_Sweep)

Nonetheless, it will be appreciated that other variants of the above formulae can be employed if required.

These new DAC values can be stored on the permanent storage of the device, if it is not possible to re-program the OTP memory. In this case, each time the camera module is initiated, it can check first for DAC Start/Stop codes in the device permanent storage and if these are not present, the module can then read the originally calibrated DAC codes from OTP memory and re-compensate as above when required or possible.

In still further variants, rather than using face detection based auto-focus (FDAF) as described above to determine a distance of an object from the camera, the camera can include a separate distance measurement system such as a laser detection auto-focus (LDAF) system such as employed in smartphones including the LG G3. In this case, a laser detection module can be used to correlate a distance of any imaged object within a scene and a detected distance for the object. Once this distance (ds) is known, the camera can proceed as described above for FDAF.

Figure 10:
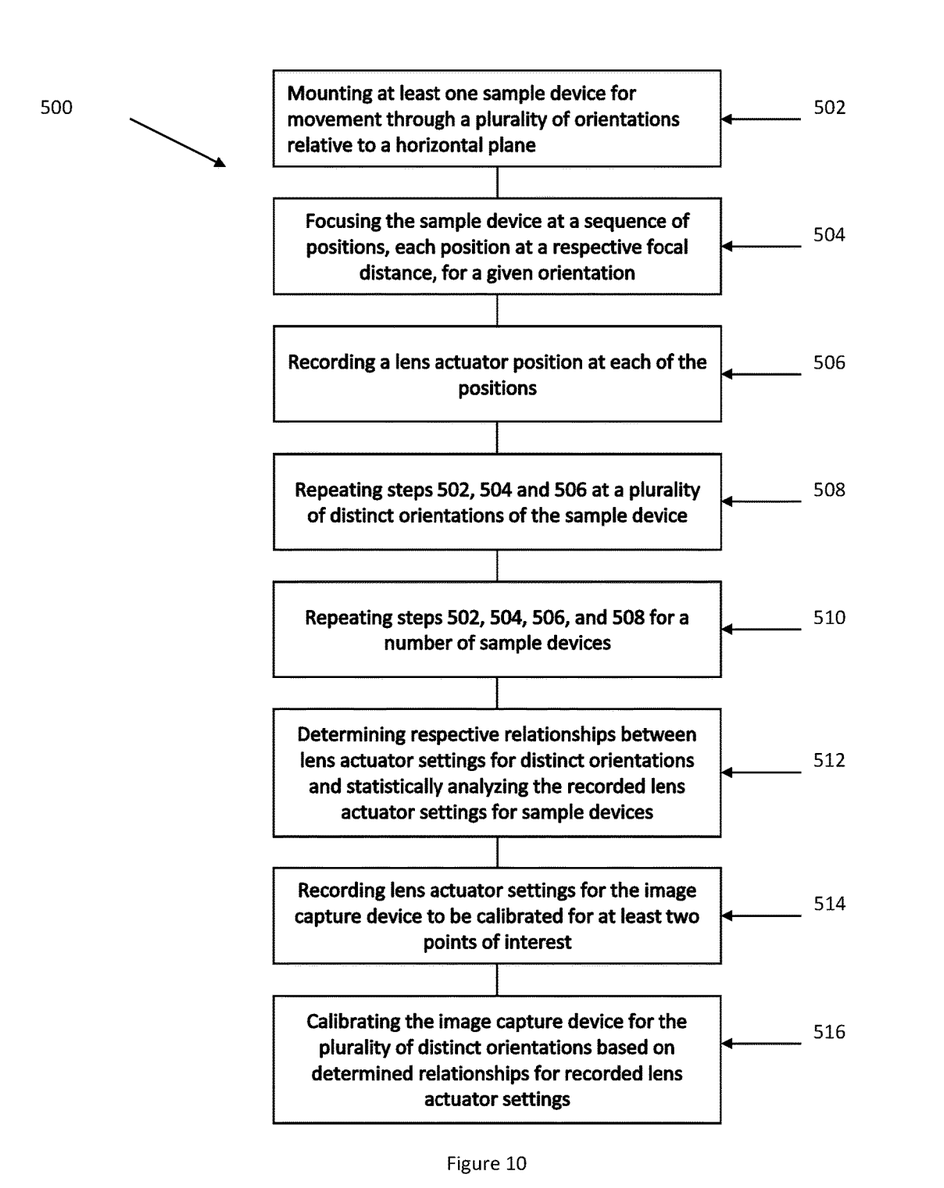
FIG. 10 illustrates the method of claim 1.

FIG. 10 describes the method 500 as claimed in claim 1. In step 502, at least one sample device from a batch is mounted for movement through a plurality of orientations relative to a horizontal plane. The sample device is focused for a given orientation in step 504. Additionally, in step 504 the sample device is focused at a sequence of positions with each position being at a respective focus distance from the device. A lens actuator setting is recorded for the sample device at each position in step 506. Steps 502, 504 and 506 are repeated at a plurality of distinct orientations of the sample device in step 508. Next (i.e., step 510), steps 502, 504, 506 and 508 are repeated for a number of sample devices from the batch. In step 512, respective relationships between lens actuator settings at any given position for distinct orientations from the plurality of distinct orientations and actuator settings at a selected orientation of the plurality of distinct orientations are determined. Also in step 512 the recorded lens actuator settings are statistically analyzed for the sample devices to determine the relationships. Lens actuator settings for the image capture device to be calibrated for at least at two points of interest (POI), each a specified focus distance from said device with said image capture device positioned at said selected orientation in step 514. Lastly, in step 516 the image capture device is calibrated for the plurality of distinct orientations based on the determined relationships and the recorded lens actuator settings.

It will be appreciated that account should be taken of the device orientation during the above compensation procedure. The procedure can be limited to run only when the camera is level, but regardless, knowledge of camera orientation helps in separating variations in lens displacement due to orientation from lens displacements due to other operating variations.

It will be seen that the above compensation procedure can be employed to compensate for operating temperature variations where the camera module has only been calibrated at a single operating temperature; but equally, compensation can be run to update the DAC codes provided at any given calibrated operating temperature.

There are a number of possibilities for triggering re-calibration of the device. For example, a recalibration application or menu option within an application or operating system menu could be made available to allow a user to re-calibrate the camera module on request. The application could even issue instructions to the user to "stand at 50 cm, 1 m, 2 m, etc, distances from the device . . . " and then pass control back to the camera module to re-calibrate accordingly.

Alternatively, re-calibration can be triggered (i) automatically after a certain time period; (ii) after a number of operational cycles have elapsed to compensate for the effects of aging; (iii) in response to abnormal temperatures being detected/determined; (this could be by direct measurement of the temperature, or by failure of the device to reach the macro or infinity positions); (iv) or otherwise.

The particular implementation may depend on device hardware and operating system capabilities, so for example, in some implementations, the re-calibration application could be allowed to reprogram the DAC settings directly; whereas in others, the application may need to interface via the camera module to reprogram its flash/EEPROM internally. In a further embodiment the actuator is configured to interpolate between the DAC codes for the various LUT angles, and determine the closed DAC setting to match a requested AF step for a specific camera orientation between −90, −30, 0, 30 and 90 degrees. Interpolation may be a simple linear one, or may use more advanced techniques depending on the sophistication of the electronic actuator that, in certain embodiments, may incorporate a dedicated microcontroller or gate array. In such an embodiment the AF algorithm on the device may specify the device orientation more precisely, up to a level of accuracy available from the motion analyzing subsystems of the device.

Alternatively a more granular set of AF steps (PoIs) may be provided in the original calibration (e.g. 50 rather than 11) and adjustment may be effected by manually adjusting the macro/infinity points from the device user interface and spacing the remaining AF steps to be equidistant, or according to a predetermined scale Again, while in the illustrated example, displacements associated with the focus POIs are equal and uniform, this aspect of the system is dependent on the optical design and frequently POIs will be more widely spaced towards the macro, or infinity end of the scale.

It will be appreciated that the invention can be readily adapted for cameras with an interchangeable or switchable lens module including cameras having a switchable visible light filter (VLF) such as used for IR imaging applications. Thus different calibration data can be stored and then selected for different lens modules or for any filters being employed by the camera.

We would also point out that for screw in lens modules, problems can arise, if the lens barrel is screwed with the camera module in the face up position at calibration time. Typically when being calibrated, the lens is screwed until a sharpness level of a test image passes a threshold. While this means that the camera module will reach the infinity position in the most favorable case (face up), in some other less favorable cases (face down, or lower ambient temperature), the focal plane (within the lens barrel) will shift relative to the image sensor due to gravity or indeed the focal length can change, making it impossible for the camera to reach the infinity position. To avoid this occurring, it can be useful to continue to screw in the lens barrel after sharpness reaches a threshold, until the sharpness level of the test image decreases again below the threshold. This over-screwing of the lens barrel can ensure that a DAC code is always available to place the lens in the infinity position.

The screwing in of a lens barrel can either be performed by a human operator or can be done automatically on a production line with suitable tooling. In the latter case, the screwing tool requires an angular value to determine the extent the lens barrel should be over-screwed. This screwing angle can be determined as follows:

For a specific camera module or batch of modules, the lens displacement shifts for all orientations and for the entire ambient temperature range [e.g. −15 . . . +45 deg C.] are measured as explained above;

Knowing the orientation of the lens barrel when being screwed into place on the production line (e.g. face up), the required lens over-screwing displacement in order to accommodate for all cases above (different orientations and thermal lens barrel/focal length shifts) can be computed. This provides a value measured in micrometers (e.g. 12 um) to over-screw the lens barrel;

Knowing the lens barrel screw slope, the over-screw value measured in rotational degrees can be computed in order to allow an automatic lens barrel screwing machine to perform the over-screwing operation. For example, if the screwing slope is 250 um/360 deg, a 12 um displacement is equivalent to 17.28 deg (12 um*360 deg/250 um) over-screwing angle.

In any case, the present invention provides for the provision of rapid and cost effective device specific calibration based on a combination of batch characterization data acquired from camera modules at multiple orientations and a given device at a single orientation.

Calibration data can be employed within an auto-focus driver or module, enabling a camera auto-focus algorithm to simply specify a required POI, in the present example, from 1 to 12, and to be confident that the camera will indeed focus at the required focus distance.

The invention claimed is:

1. A method for calibrating an image capture device comprising:
   a) mounting at least one sample device from a batch for movement through a plurality of orientations relative to a horizontal plane,
   b) for a given orientation, focusing said sample device at a sequence of positions, each position being at a respective focus distance from said device;
   c) recording a lens actuator setting for said sample device at each position;
   d) repeating steps b) and c) at a plurality of distinct orientations of said sample device;
   e) repeating steps a) to d) for a number of sample devices from the batch;
   f) determining respective relationships between lens actuator settings at any given position for distinct orientations from said plurality of distinct orientations and actuator settings at a selected orientation of said plurality of distinct orientations, and statistically analyzing the recorded lens actuator settings for said sample devices to determine said relationships;
   g) recording lens actuator settings for said image capture device to be calibrated at least at two points of interest (POI), each a specified focus distance from said device with said image capture device positioned at said selected orientation; and
   h) calibrating said image capture device for said plurality of distinct orientations based on said determined relationships and said recorded lens actuator settings.

2. A method according to claim 1 comprising positioning a test pattern at each specified focus distance from said device to enable said device to focus at said specified focus distance.

3. A method according to claim 1 wherein step f) comprises recording said lens actuator settings at each of a camera macro and infinity setting and interpolating lens actuator settings for each POI between said macro and infinity settings at said selected orientation according to a modelled relationship between lens actuator setting and focus distance.

4. A method according to claim 3 wherein said image capture device includes a camera module including a MEMS actuated lens and wherein said modelled relationship is of the form Capacitance=A*exp(B*lens actuator setting+C) where A, B and C are scalar values.

5. A method according to claim 3 wherein said image capture device includes a camera module including a VCM actuated lens and wherein said modelled relationship is linear.

6. A method according to claim 1 wherein step f) comprises recording said lens actuator settings at each POI between said device macro and infinity settings at said selected orientation.

7. A method according to claim 1 wherein said selected orientation is horizontal and said plurality of distinct orientations include −90, −30, 30 and 90 degrees relative to horizontal.

8. A method according to claim 1 wherein said lens actuator settings comprise DAC codes for positioning said lens at each POI.

9. A method according to claim 8 wherein said image capture device includes a camera module including a MEMS actuated lens.

10. A method according to claim 9 wherein step c) comprises:
iteratively sweeping through DAC codes for a sample device;
recording a lens actuator capacitance for each DAC code.

11. A method according to claim 9 wherein step f) comprises:
recording a lens actuator capacitance at macro and infinity settings; and
recording a DAC code at said at least two POI.

12. A method according to claim 1 wherein said image capture device includes a camera module including a VCM actuated lens.

13. A method according to claim 1 wherein said step g) comprises recording said determined relationships and said recorded lens actuator settings in device memory.

14. A method according to claim 1 wherein said step g) comprises combining said recorded lens actuator settings with said determined relationships to provide a table comprising lens actuator settings for each orientation and each POI and recording said table in device memory.

15. A method according to claim 1 comprising repeating steps f) and g) for each of a number of operating temperatures.

16. A method according to claim 15 wherein said operating temperatures correspond to a temperature sensor reading for one of: a camera lens or the image capture device.

17. A method according to claim 1 wherein said calibrating said image capture device comprises storing device specific calibration information in one time programmable memory (OTP) within said image capture device.

* * * * *